(12) United States Patent
Boddu et al.

(10) Patent No.: US 10,934,002 B2
(45) Date of Patent: Mar. 2, 2021

(54) AIRCRAFT PASSENGER SEAT EXTENDED ARMREST

(71) Applicant: AMI Industries, Inc., Colorado Springs, CO (US)

(72) Inventors: Radha Boddu, Karnataka (IN); Gaurav Sahay, Karnataka (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 423 days.

(21) Appl. No.: 15/936,497

(22) Filed: Mar. 27, 2018

(65) Prior Publication Data

US 2019/0225342 A1 Jul. 25, 2019

(30) Foreign Application Priority Data

Jan. 19, 2018 (IN) .............................. 201811002320

(51) Int. Cl.
*B64D 11/06* (2006.01)
*B60N 2/75* (2018.01)

(52) U.S. Cl.
CPC .......... *B64D 11/0644* (2014.12); *B60N 2/753* (2018.02); *B60N 2/763* (2018.02); *B60N 2/777* (2018.02); *B64D 11/06* (2013.01); *B64D 11/0646* (2014.12)

(58) Field of Classification Search
CPC . B64D 11/0644; B64D 11/0646; B64D 11/06; B60N 2/753; B60N 2/777; B60N 2/763
See application file for complete search history.

(56) References Cited

U.S. PATENT DOCUMENTS

| | | | |
|---|---|---|---|
| 5,795,025 A | 8/1998 | Murphy | |
| 7,959,231 B2 | 1/2011 | Lee | |
| 8,146,999 B2 | 4/2012 | Ferguson et al. | |
| 9,227,539 B2 | 1/2016 | Locke | |
| 10,556,523 B1* | 2/2020 | Rajasingham | B64D 11/0601 |
| 2005/0194827 A1 | 9/2005 | Dowty et al. | |
| 2011/0148156 A1* | 6/2011 | Westerink | B60N 3/001 |
| | | | 297/162 |
| 2013/0147245 A1* | 6/2013 | Torres | B60N 2/7005 |
| | | | 297/227 |
| 2014/0138991 A1* | 5/2014 | Deimen | B64D 11/0601 |
| | | | 297/101 |

(Continued)

FOREIGN PATENT DOCUMENTS

KR 200367088 Y1 11/2004

OTHER PUBLICATIONS

European Search Report for Application No. 19152121.0-1010, dated Mar. 27, 2019, 9 pages.

*Primary Examiner* — Rodney A Bonnette
(74) *Attorney, Agent, or Firm* — Cantor Colburn LLP

(57) ABSTRACT

An aircraft seat armrest includes an armrest portion and two extension elements coupled to the armrest portion on opposite sides thereof. A first of the two extension elements is rotatable from a first, closed, position where it is disposed below the armrest portion to a second, open, position wherein the first extension element is adjacent to the armrest portion. The arm rest also includes a first locking mechanism disposed on the first extension element that maintains the first extension element in the open position after it has been moved from the closed position to the open position.

16 Claims, 4 Drawing Sheets

(56) References Cited

U.S. PATENT DOCUMENTS

| | | |
|---|---|---|
| 2014/0217798 A1 | 8/2014 | Negusse |
| 2015/0165944 A1 | 6/2015 | Almeida et al. |
| 2015/0210395 A1 | 7/2015 | Saint-Jalmes |
| 2016/0135602 A1* | 5/2016 | Smith .................. A47B 83/021 297/115 |
| 2016/0355265 A1 | 12/2016 | Shh |
| 2017/0088268 A1* | 3/2017 | Kinard ............... B64D 11/0646 |
| 2017/0215592 A1 | 8/2017 | Cummins |

* cited by examiner

AIRCRAFT PASSENGER SEAT EXTENDED ARMREST

FOREIGN PRIORITY

This application claims priority to Indian Patent Application No. 201811002320 filed Jan. 19, 2018, the entire contents of which is incorporated herein by reference.

BACKGROUND

Exemplary embodiments pertain to the art of aircraft seats and, in particular, adjustable armrests in aircraft passenger seats.

Passenger aircraft compartments typically include several rows of seats. Between adjacent seats are armrests. The armrest is typically only suitable for resting one forearm of one passenger only. Often, the passengers in the adjacent seats are expected to use the common armrest in between them. The passengers in the middle seats end up using the common armrest on both sides. In short, there is not enough space for both the passengers to use at the same time and simultaneous use of an armrest by two co-passengers causes discomfort to both involved.

In areas of the plane where more space is allowed (e.g., first class), each seat includes two dedicated armrests. However, in more space constrained regions of the aircraft (e.g., coach), providing such armrests is not practicable.

BRIEF DESCRIPTION

Disclosed in one embodiment is an aircraft seat armrest that includes an armrest portion and two extension elements coupled to the armrest portion on opposite sides thereof. A first of the two extension elements is rotatable from a first, closed, position where it is disposed below the armrest portion to a second, open, position wherein the first extension element is adjacent to the armrest portion; The armrest also includes a first locking mechanism disposed on the first extension element that maintains the first extension element in the open position after it has been moved from the closed position to the open position.

In one aspect of any prior embodiment, a second of the two extension elements is movable from the first, closed, position where it is disposed below the armrest portion and the second, open, position wherein the second extension element is adjacent to the armrest portion. In this embodiment, the armrest also includes a second locking mechanism disposed on the second extension element that maintains the second extension element in the open position after it has been moved from the closed position to the open position.

In one aspect of any prior embodiment, the first and second locking mechanisms are bolt latches.

In one aspect of any prior embodiment, the first and second locking mechanisms include bolts that mate with a bolt retention element disposed on the armrest portion.

In one aspect of any prior embodiment, wherein the bolt retention element is a staple disposed on a bottom of the armrest portion.

In one aspect of any prior embodiment, the armrest includes any or all of: a first arm extension retention element disposed on the first side of the first arm extension; and a second arm extension retention element disposed on the first side of the first arm extension.

In one aspect of any prior embodiment, the armrest also includes one or more of: a first extension retention element disposed on the armrest portion that mates with the first arm extension retention element that maintains the first extension element in the closed position; and a second extension retention element disposed on the bottom of the armrest portion that mates with the second arm extension retention element that maintains the second extension element in the closed position In one aspect of any prior embodiment, the first and second arm extension retention elements are magnets and the first and second extension retention element are formed of magnetic material.

In one aspect of any prior embodiment, the first and second arm extension retention elements are formed of magnetic material and the first and second extension retention element are magnets.

In one aspect of any prior embodiment, the two extension elements are coupled to the armrest portion by hinges.

In one embodiment, a method of expanding an aircraft armrest is disclosed. The method includes: providing an armrest portion and coupling two extension elements to the armrest portion on opposite sides thereof such that they can rotate relative to the armrest portion. In this method, the two extension elements are coupled such that a first of the two extension elements can move from a first, closed, position where it is disposed below the armrest portion to a second, open, position wherein the first extension element is adjacent to the armrest portion. The method also includes providing the first extension element with a first locking mechanism disposed on the first extension element that can maintain the first extension element in the open position.

In one aspect of any prior method, the method includes providing a second locking mechanism disposed on the second extension element that can maintain the second extension element in the open position after it has been moved from the closed position to the open position.

In one aspect of any prior method, the first and second locking mechanisms are bolt latches.

In one aspect of any prior method, the first and second locking mechanisms include bolts that mate with a bolt retention element disposed on the armrest portion.

In one aspect of any prior method, the method includes: providing a first arm extension retention element on the first arm extension; and providing a second arm extension retention element on the first arm extension.

In one aspect of any prior method, the method includes: providing a first extension retention element on the armrest portion that mates with the first arm extension retention element that maintains the first extension element in the closed position; and providing a second extension retention element on the armrest portion that mates with the second arm extension retention element that maintains the second extension element in the closed position.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
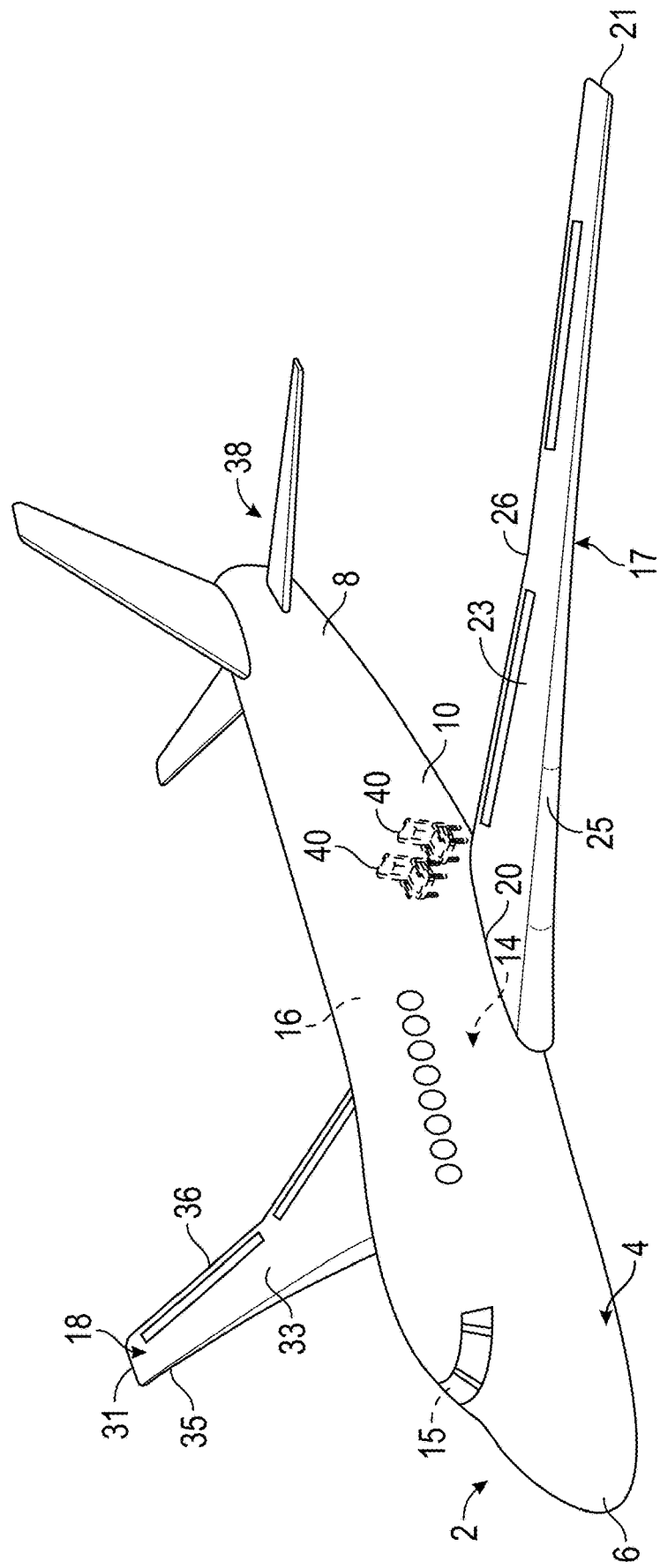
FIG. 1 is a perspective view of an aircraft that may incorporate embodiments of the present disclosure.

Referring now to FIG. 1, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes one or more seats 40 in the passenger compartment 16 of the aircraft. The seats 40 may also be mounted within the crew compartment 15. As will be appreciated by those of skill in the art, the seats 40 may also be mounted within a building and/or within various types of vehicles including but not limited to automotive, aerospace, naval, locomotive, and railway. As detailed further below, the seat 40 has an adjustable armrest in one embodiment. As shown, the aircraft 2 includes at least two adjacent seats 40.

Figure 2:
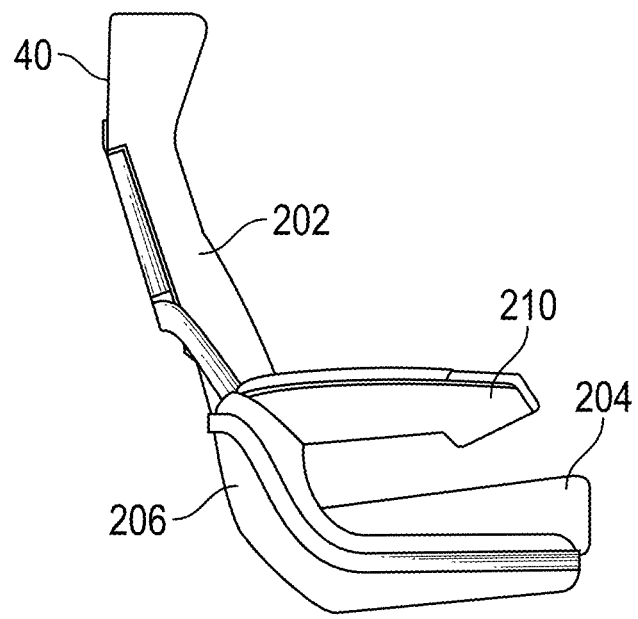
FIG. 2 is a side-view of a prior art aircraft seat on which embodiments of the present disclosure may be implemented.

FIG. 2 is a simplified version of a seat 40 according to one embodiment. The seat 40 includes a seat back 202 and a seating portion 204. The seat 40 also included a frame 206. The frame 206 could carry one or more adjacent seats in one embodiment or be attached to another frame that allows for another seat to be carried. As discussed above, when two seats are adjacent, the combination of the adjacent seats includes a single armrest 210. That is, one seat 40 may include an armrest while an adjacent seat 40 does not so that the two adjacent seats must share.

Such an armrest 210 in the prior art is suitable for a single use only. Simultaneous use of an armrest by two co-passengers is not possible and, as a result, adjacent users may become frustrated and annoyed because their armrest is in use by a neighbor. In order to improve passenger comfort in adjacent seats, there is a need of foldable extension to the armrest for the middle seats to create more armrest space.

Figure 3:
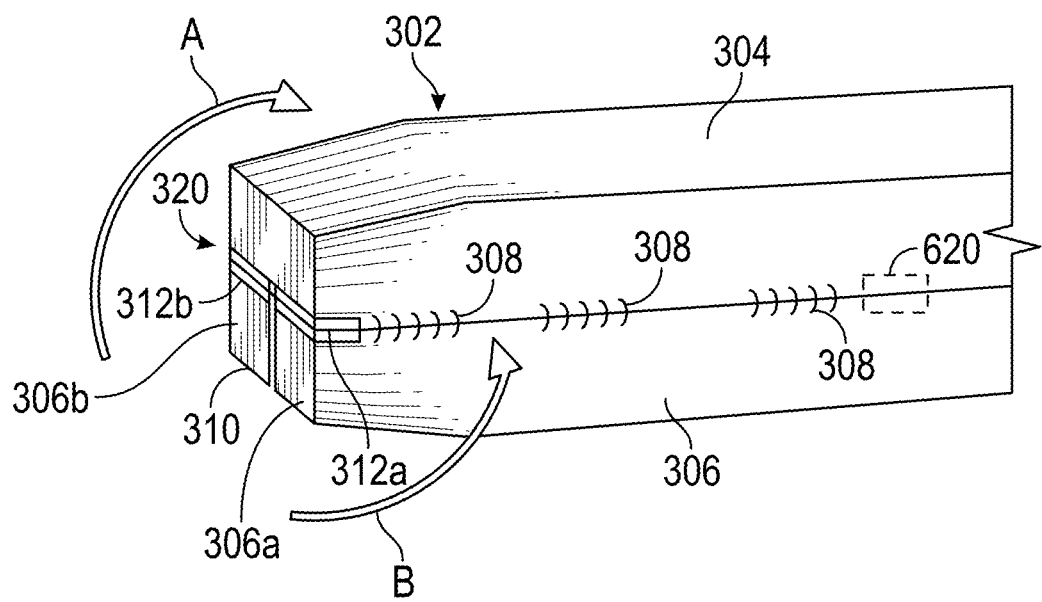
FIG. 3 shows an expandable armrest according to one embodiment of the present disclosure in a closed position.

FIG. 3 shows an example of an armrest 302 according to one embodiment. In one embodiment, the armrest 302 is attached to or otherwise accessible by an occupant in a middle seat. However, the armrest 302 could be attached to any seat and, in particular, to an armrest between any two adjacent seats. The armrest 302 can replace the armrest 210 shown in FIG. 2.

The armrest 302 includes a top portion 304. The top portion 304 can be same or similar to the top of a prior art armrest. Attached to the armrest 302 is an armrest extension 306 that can rotate relative to the armrest extension. As illustrated, the armrest extension 306 includes two portions 306a/306b. The armrest 302 and the extensions are attached to one another by one or more rotatable fasteners 308. In one embodiment, the fasteners 308 are hinges.

The one embodiment, the top portion has an area. When the armrest extensions 306 are move to their open state (see FIG. 4), the area of the top of the unit comprising the top portion 304 and tops of the extensions 306a/306b can be roughly twice the area of the top portion 304 considered alone.

Also illustrated in FIG. 3 are two locking mechanisms 312a/312b. The location of these locking mechanisms can be varied from what is shown in FIG. 3. As illustrated, the first and second locking mechanisms 312a/312b are located at or near a front 320 of the armrest 302. The third locking mechanism 310a (FIG. 4) could be omitted on one embodiment but if included, it can located further away from the front 320 of the armrest 302. In another embodiment, the first and second locking mechanisms 312a/312b can be omitted and a third locking mechanism 310a and fourth locking mechanism 310b (see FIG. 5) can be the only locking mechanism that hold the extensions 306a/306b in the open position.

Figure 4:
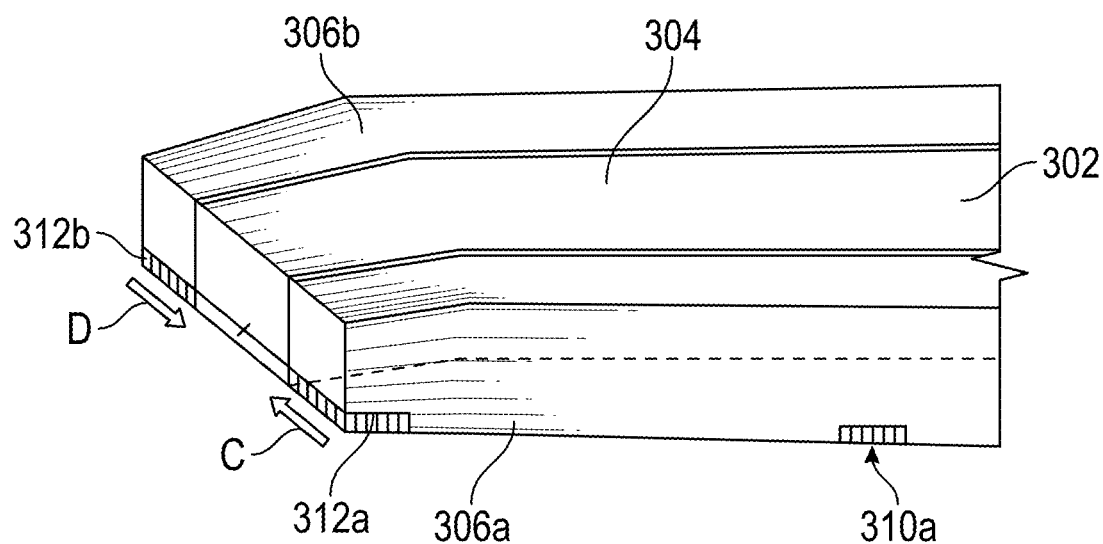
FIG. 4 shows an expandable armrest according to one embodiment of the present disclosure in an "open" or "expanded position.

To move from the closed position of FIG. 3 to the open position of FIG. 4, the extensions 306a/306b can be moved in the directions shown by arrows A and B, respectively, in FIG. 3. As illustrated in FIG. 3, the extensions 306a/306b are below the armrest 302.

After the extensions 306a/306b are moved in the directions shown by arrows A and B, respectively, in FIG. 3, a portion of the first and third locking mechanisms 310a/312a can move in direction C (FIG. 4) and a portion of the second locking mechanism 312b can move in direction D (FIG. 4) to lock the extensions 306a/306b in place. In FIG. 4, the extensions 306a/306b are adjacent to the armrest 302.

Figure 5:
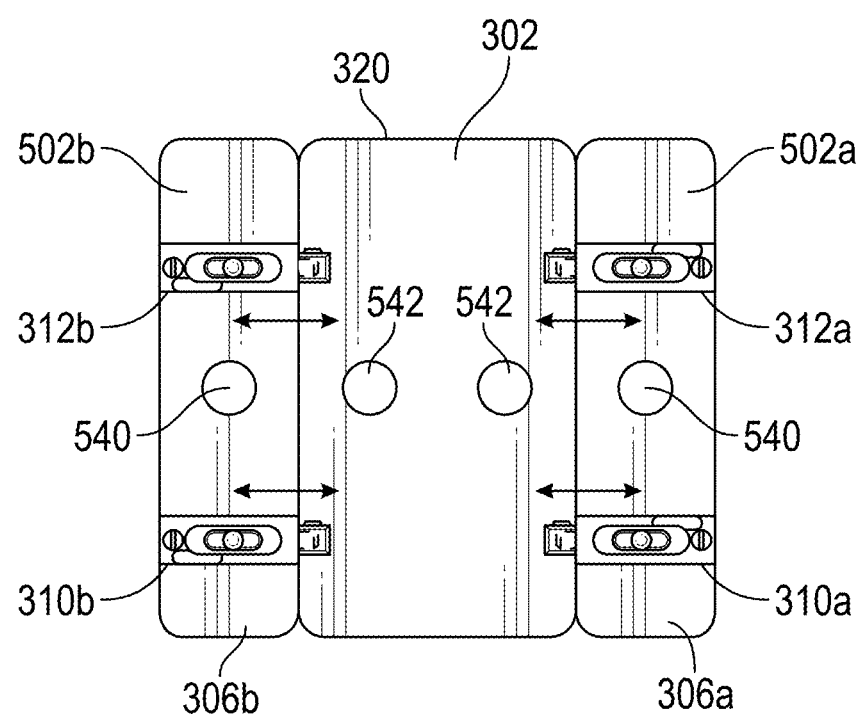
FIG. 5 shows a bottom view of an armrest in an expanded position and the locking members that keep it in the expanded position as well as members that keep it in the closed position.
Figure 6:
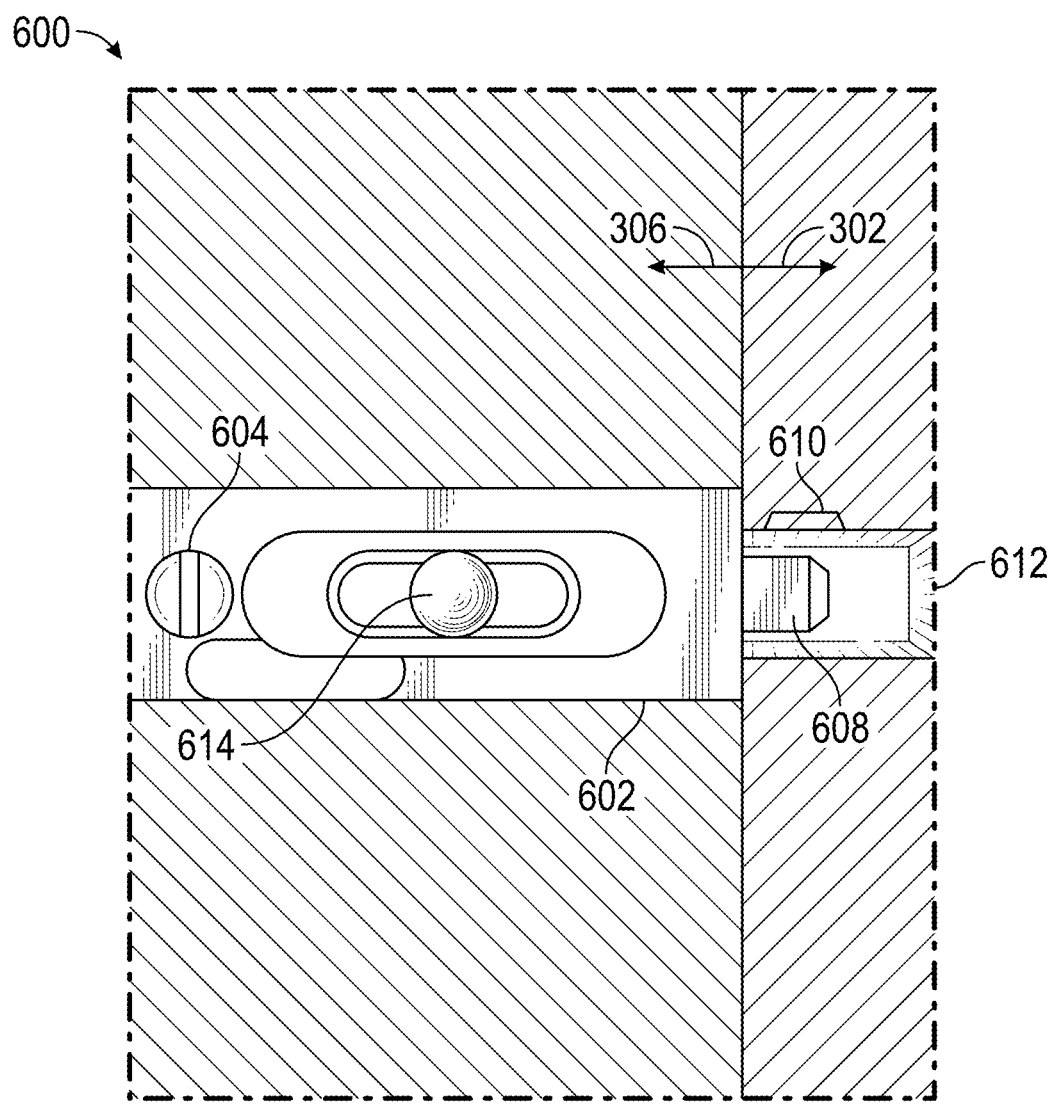
FIG. 6 shows an example latch that can be utilized in one embodiment.

In one embodiment, and as best seen in FIGS. 5 and 6, the locking mechanisms 312a/312b, 310a/310b are bolt latches. The bolt latches 312a/312b are located further from the front 320 of the armrest 302 in FIG. 5 as comparted to FIG. 4 to illustrate different placement options for the latches. The latches are secured to a bottom 502a/502b of the respective extensions.

Each bolt latch (shown as element 600 in FIG. 6), includes a faceplate 602 through which one or more fasteners such as screw 604 can pass to attach it to the bottom 502a/502b of the extensions 306.

The latch 600 can also include a moveable bolt 608 with a bolt throw 610. The bolt can pass into a bolt retention element 612 in one embodiment. The bolt retention element 612 can be staple in one embodiment.

In one embodiment, the latch 600 is attached to the bottom of the extensions such that the bolt 608 enters a hole or other depression in a side of the armrest 302 that forms the bolt retention element 612. An example of such a hole is shown in phantom by element 620 in FIG. 3.

The latch 600 also includes a release mechanism 614 that allows the bolt 608 to disengage from the bolt retention element 612.

Referring again to FIG. 5, the armrest 302 can include one or more extension retention elements 540 that serve to keep the extensions 306a/306b in the closed position. In one embodiment, the arm extension retention elements 542 are magnets that engage with extension retention elements 542 made of a magnetic material disposed on the bottom of the extensions 306a/306b.

In another embodiment, the arm extension retention elements 540 are made of a magnetic material that engage with extension retention elements 542 that are formed of magnets and disposed on the bottom of the extensions 306a/306b.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft seat armrest including:
    an armrest portion having a top configured to support a passenger arm and a bottom that is opposite the top;
    two extension elements coupled to the armrest portion on opposite sides thereof, each extension having a top configured to support a passenger arm and a bottom that is opposite the top of the extension element;
    wherein a first of the two extension elements is rotatable from a first, closed, position where it is disposed below the top of the armrest portion to a second, open, position wherein the first extension element is adjacent to the armrest portion;
    a first locking mechanism disposed on the first extension element that maintains the first extension element in the open position after it has been moved from the closed position to the open position;
    a first arm extension retention element disposed on the bottom of the first arm extension; and
    a first extension retention element disposed on the bottom of the armrest portion that mates with the first arm extension retention element when the first arm extension element is in the closed position and that maintains the first extension element in the closed position.

2. The aircraft seat armrest of claim 1, wherein a second of the two extension elements is movable from the first, closed, position where it is disposed below the armrest portion and the second, open, position wherein the second extension element is adjacent to the armrest portion; and further comprising:
    a second locking mechanism disposed on the second extension element that maintains the second extension element in the open position after it has been moved from the closed position to the open position.

3. The aircraft seat armrest of claim 2, wherein the first and second locking mechanisms are bolt latches.

4. The aircraft seat armrest of claim 3, wherein the first and second locking mechanisms include bolts that mate with a bolt retention element disposed on the armrest portion.

5. The aircraft seat armrest of claim 4, wherein the bolt retention element is disposed on the bottom of the armrest portion.

6. The aircraft seat armrest of claim 2, further comprising:
    a second arm extension retention element disposed on the first side of the second arm extension.

7. The aircraft seat armrest of claim 6, further comprising:
    a second extension retention element disposed on the bottom of the armrest portion that mates with the second arm extension retention element that maintains the second extension element in the closed position.

8. The aircraft seat armrest of claim 7, wherein the first and second arm extension retention elements are magnets and the first and second extension retention element are formed of magnetic material.

9. The aircraft seat armrest of claim 7, wherein the first and second arm extension retention elements are formed of magnetic material and the first and second extension retention element are magnets.

10. The aircraft seat armrest of claim 1, wherein the two extension elements are coupled to the armrest portion by hinges.

11. A method of expanding an aircraft armrest, the method comprising:
    providing an armrest portion;
    coupling two extension elements to the armrest portion on opposite sides thereof such that they can rotate relative to the armrest portion;
    wherein the two extension elements are coupled such that a first of the two extension elements can move from a first, closed, position where it is disposed below the armrest portion to a second, open, position wherein the first extension element is adjacent to the armrest portion;
    providing the first extension element with a first locking mechanism disposed on the first extension element that can maintain the first extension element in the open position;
    disposing a first arm extension retention element on a bottom of the first arm extension; and
    disposing a first extension retention element on the bottom of the armrest portion that mates with the first arm extension retention element when the first arm extension element is in the close position and that maintains the first extension element in the closed position.

12. The method of claim 11, further comprising:
    providing a second locking mechanism disposed on the second extension element that can maintain the second extension element in the open position after it has been moved from the closed position to the open position.

13. The method of claim 12, wherein the first and second locking mechanisms are bolt latches.

14. The method of claim 13, wherein the first and second locking mechanisms include bolts that mate with a bolt retention element disposed on the armrest portion.

15. The method of claim 11, further comprising:
    providing a second arm extension retention element on the second arm extension.

16. The method of claim 15, further comprising:
    providing a second extension retention element on the armrest portion that mates with the second arm extension retention element that maintains the second extension element in the closed position.

* * * * *